United States Patent [19]

Lingl, Jr.

[11] 3,717,264
[45] Feb. 20, 1973

[54] MACHINE FOR UNLOADING AND BLENDING LAYERED STACKS OF BRICKS OR SIMILAR ARTICLES

[75] Inventor: Hans Lingl, Jr., Paris, Tenn.

[73] Assignee: Lingl-Bell Corporation, Gleason, Tenn.

[22] Filed: April 30, 1971

[21] Appl. No.: 139,285

Related U.S. Application Data

[62] Division of Ser. No. 39,707, May 22, 1970, Pat. No. 3,603,466.

[52] U.S. Cl. ............................................. 214/8.5 C
[51] Int. Cl. .............................................. B65g 59/02
[58] Field of Search .......... 214/8.5 C, 8.5 SS, 16.4 C, 214/16.1 CF

[56] References Cited

UNITED STATES PATENTS

| | | | |
|---|---|---|---|
| 3,601,266 | 8/1971 | Pearne | 214/8.5 C |
| 3,656,634 | 4/1972 | Pearne | 214/8.5 C |

Primary Examiner—Gerald M. Forlenza
Assistant Examiner—George F. Abraham
Attorney—Cushman, Darby & Cushman

[57] ABSTRACT

Apparatus and method for mechanically unloading a layer or double layers of layered stacks of rows of bricks or similar articles stacked, for example, on kiln cars or pallets and for selectively and variably blending bricks from different rows and/or from different layers of the stack to provide a blended balance between different brick firing qualities and/or to achieve special coloring effects in the final blended output. Bricks from one layer of the stack are stored on one of a plurality of storage levels and one or two rows of bricks from each level are separated and mixed with other separated rows of bricks from the same or other storage levels to achieve the desired blending pattern. Special handling also permits the mixing of bricks from less than a whole row of bricks from one layer with less than a whole row of bricks from another layer for increased flexibility in achieving any desired blend.

8 Claims, 7 Drawing Figures

MACHINE FOR UNLOADING AND BLENDING LAYERED STACKS OF BRICKS OR SIMILAR ARTICLES

This application is a division of my copending application Ser. No. 39,707, filed May 22, 1970, now U.S. Pat. No. 3,603,466.

This invention relates to an apparatus and method for automatically or mechanically unloading and blending layered stacks of bricks from pallets or cars after firing in a kiln to produce a variable blending pattern of consecutive rows or half rows of bricks from the various layers before feeding the blended brick output to stackers and final packaging equipment such as strapping machines or shrink-foil packaging machines.

Generally, the invention relates to the handling and blending of bricks or any other similar uniformly dimensioned articles after firing or curing. An object of this invention is to provide a method and apparatus having the capability of blending bricks in a highly flexible pattern from different layers and sections of layered stacks emerging from a kiln to either balance differences in firing quality (i.e., difference in color or shrinkage, etc.) caused by nonuniform conditions during previous processing, or to achieve special color effects by blending bricks having different colors.

It is another object of this invention to provide novel apparatus and process techniques of superior capacity for unloading and blending bricks or similar articles as stated above at high production rates comparable to the production rates of automatic machinery in the upstream side of the manufacturing processes under consideration.

Yet another object of this invention is to provide the described unloading and blending while avoiding any unnecessary chipping or other damage to the bricks caused by rough handling.

Automatic unloading machines without any blending capacity are known in the prior art. For instance, U.S. Pat. No. 3,487,959 (Pearne et al.) reveals an unloader for unloading double layers of rows of bricks in layered stacks emerging from a kiln. Initially upon exit from the kiln, the rows of bricks are spaced apart as required by the firing process in the kiln. This prior art unloader picks up double layers of rows by first pushing the rows together (by directly sliding the top double layer over an adjacent perpendicularly oriented lower double layer) thus causing damage by chipping the edges of bricks during the sliding action. However, this prior art unloader relates strictly to the unloading of bricks and provides no blending capacity at all.

Since the grade or quality distribution of bricks on different kiln cars and even on different levels within the same kiln car is quite uneven, it is very advantageous to provide for the selective and variable blending of bricks from different layers and/or from different kiln cars to compensate for such uneven grade or quality distributions. For instance, experience has shown that two thirds of the bricks on any given kiln car may be of one quality while the remaining one third divides into several other different qualities. The known prior systems do not permit balanced flexible or variable blending patterns for bricks having such variations in quality distributions from one car or layer to the next.

Accordingly, it is another object of this invention to provide for increased blending flexibility to meet the variable grade distribution of bricks on various levels of various kiln cars in any desired pattern without reducing the speed or the capacity of the unloading and blending device whenever additional grades are blended.

Briefly, this invention involves method and apparatus for unloading, unfacing and closing up a spaced-apart double layer of bricks (if single layers are unloaded the unfacing and unloading operations may be combined) from a kiln car or pallet and subsequently storing the resulting unfaced laterally abutting rows of bricks from a layer upon one of a plurality of storage levels. From here, individual (double rows if two stackers are utilized) consecutive rows or less than whole rows (half rows) or bricks may be indexed out of the various storage levels and blended before delivery to one or more final output stacking devices for final packaging. Storage on any one of the storage levels is achieved by a vertically adjustable storage elevator conveyor which, in the exemplary embodiment, has two conveyor levels such that bricks may be simultaneously transferred into and out of the elevator at the same or different levels to increase the brick handling and blending capacity of the machine.

In addition, the blending of indexed rows from the various storage levels is achieved by conveying each of the indexed double or single rows onto a vertically adjustable blender elevator. In the illustrative embodiment, the blender elevator also comprises at least two conveyor elevator levels such that bricks may be transferred out of the blender elevator to the stacking device at one level simultaneously with bricks being delivered into the blender elevator at the same or another nonaligned storage level. In addition, the illustrative embodiment comprises a blender elevator having a length equal to approximately one and one-half rows of bricks with a special brick stopping device at the output side of each level of the conveyor for preventing the final one-half row of bricks from moving off the end of the elevator. In this manner, at least one-half row of bricks is always maintained on each level of the blender elevator such that a final one-half row of bricks from any storage level may be mixed with the first one-half row from any other storage level thereby permitting blending of bricks from less than a whole row.

A more complete and detailed understanding of this invention may be obtained by carefully studying the following detailed description in combination with the drawings of which:

FIG. 4 is an enlarged fragmentary perspective view of the device shown in FIG. 1 used for closing up a double layer of spaced apart bricks and the device used for unfacing such a closed-up double layer. (FIG. 4 is a view taken in the general direction of arrows 4—4 in FIG. 1);

Figure 1:
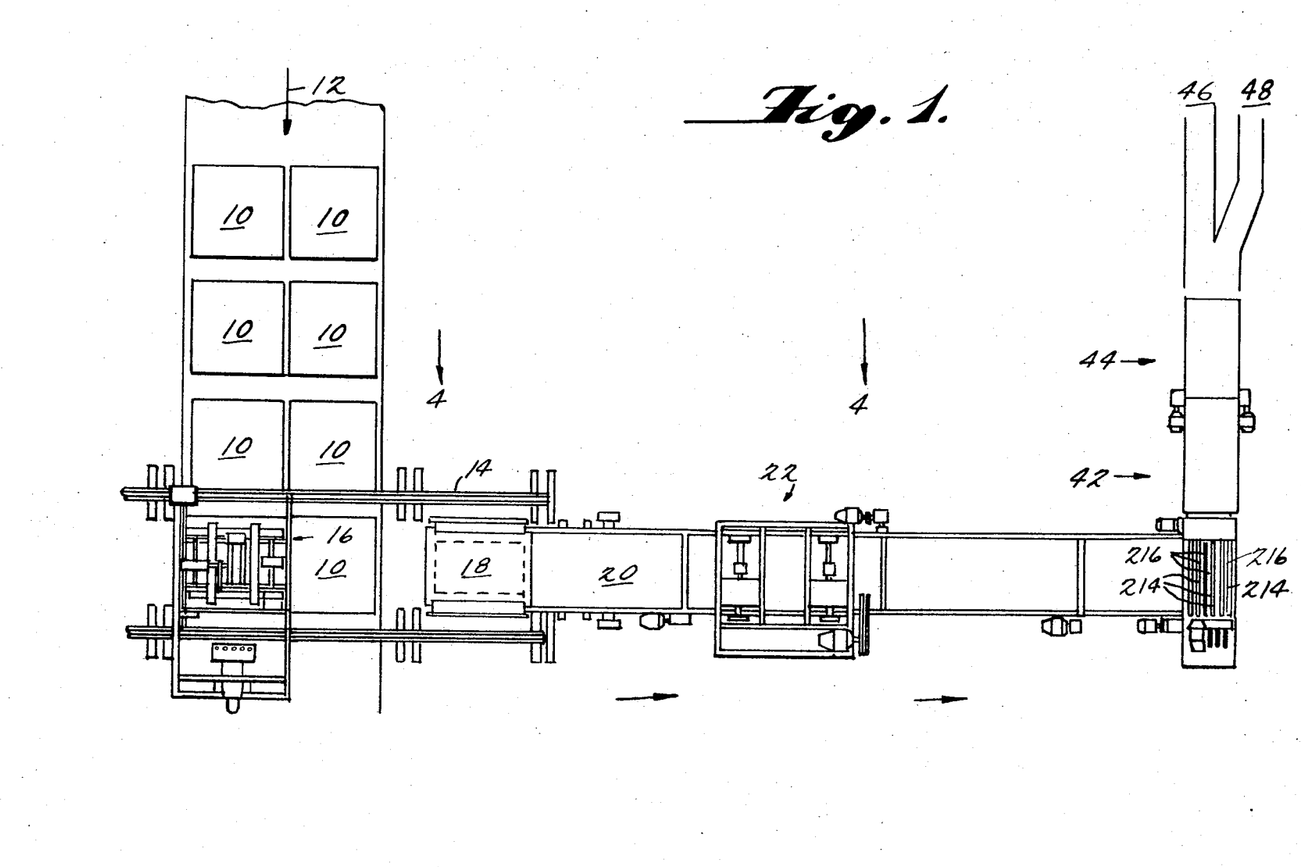
FIG. 1 represents a plan view of an exemplary embodiment of an apparatus for practicing this invention.
Figures 2, 5:
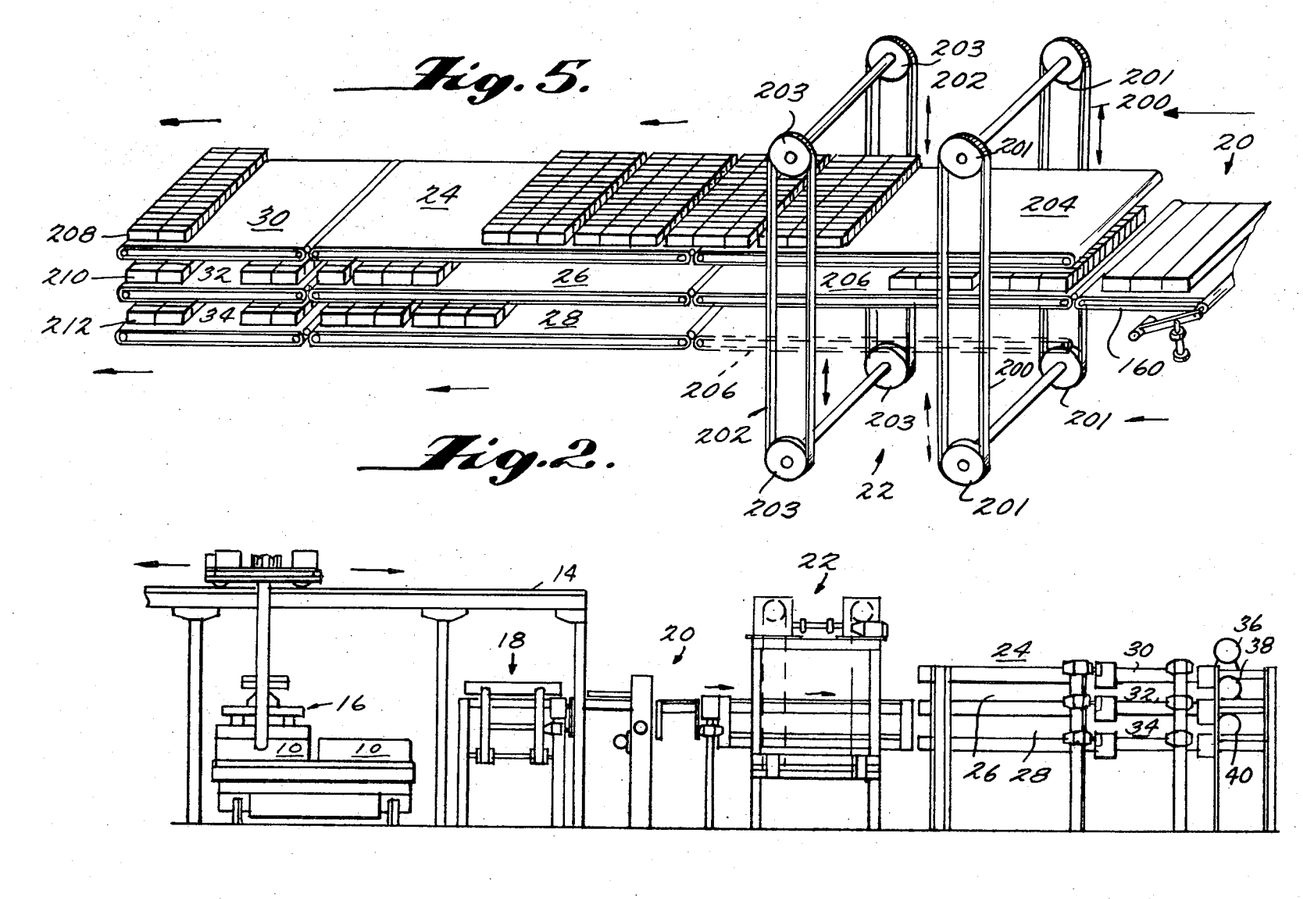
FIG. 2 is an elevational view of the apparatus shown in FIG. 1.
FIG. 5 is an enlarged, fragmentary perspective view of the storage elevator and various storage and buffer conveyors shown in FIG. 1.
Figure 6:
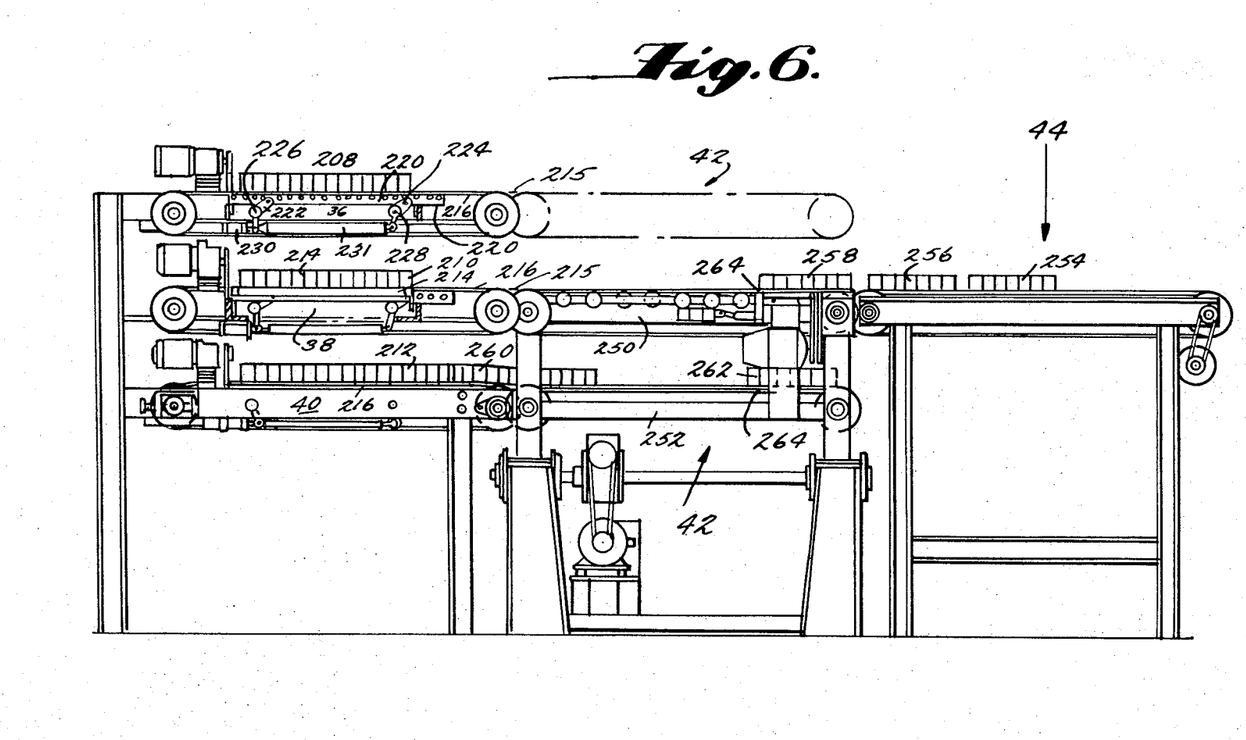
FIG. 6 is an enlarged and elevation view of the device shown in FIG. 1 and looking in the direction from right-to-left in FIG. 1.

Referring to FIGS. 1, 2, and 6, the features of this invention will be generally described with more specific detail being given in reference to the remaining figures and FIG. 6.

Layered stacks of bricks or similar uniformly dimensioned articles are shown at 10 moving in the direction of arrow 12 towards a gantry frame 14 upon which a gripping device 16 is permitted to travel for gripping layers of bricks from stacks 10 and transferring them to a receiving table 18. In the preferred embodiment, the handling capacity of this invention is such that additional parallel travelling cars from other kilns may also be unloaded by lengthening gantry frame 14 permitting gripper 16 to travel over these additional kiln cars, as will be evident.

Bricks in stacks 10 are commonly stacked in spaced apart rows of double layers with the faces of the bricks abutting one another such that the bottom one of the double layer is facing upwardly while the top one is facing downwardly. In the preferred illustrative embodiment, the gripping device 16 grips such a spaced-apart double layer off the top of a stack 10 underneath gantry 14 and transfers the gripped double layer to receiving table 18. While the bricks are in the kiln, they are spaced apart to facilitate the firing process and the receiving table 18 includes means for closing up such spaced-apart bricks to form laterally abutting rows of double layers of bricks. Thereafter, the bricks are conveyed to an unfacing conveyor table 20 where the top closed-up layer is separated from the bottom closed-up layer and rotated through substantially 180° to the left (as shown in FIGS. 1 and 2) thus forming two groups of laterally abutting rows of bricks in a single layer, all facing upwardly. Of course, if desired a single layer rather than a double layer may be transferred off the stacks by gripper 16.

After such an unfacing operation at 20, bricks are then conveyed into a storage elevator section at 22 where, after any necessary vertical adjustment, the bricks may be conveyed into any one of the storage conveyor levels 24, 26 or 28. The storage levels also include buffer storage conveyor areas 30, 32 and 34 respectively corresponding to the main storage levels 24, 26 and 28, as best seen in FIG. 2. The bricks are indexed two rows at a time to feed two stackers (only one row is indexed if only one stacker is utilized) onto the buffer conveyors 30, 32 and 34. After the separated indexed double rows of bricks at each of the storage/blender levels have been conveyed into blender feeding conveyor levels 36, 38 and 40, respectively, each consecutive double row of bricks is then individually and selectively conveyed onto a blender elevator conveyor at 42 (see FIGS. 1 and 6) which may be vertically adjusted to transfer the bricks in a final blended order to a final off-loading conveyor 44 for final delivery to stackers and packaging apparatus as at 46 and 48, as will be understood.

In the illustrative embodiment, blender elevator 42 has a length substantially equal to one and one-half the length of a single row of laterally abutting bricks such that the final one-half of a preceding row of bricks may be maintained on the righthand portion of conveyor 42 (see FIG. 6) while another whole row of bricks from the same or different storage level is conveyed to fill up the space remaining at the left of this final half row. Subsequently, if this level of the blending elevator is aligned with loading conveyor 44 and the conveyor 42 is indexed to deliver a whole row of bricks, the blended output will comprise the final one-half of the preceding row plus the first one-half of the newly added row. Thus, the half row from the preceding row is effectively combined with the first half row of the subsequent row from the same or a different storage level thus permitting half rows of bricks from any storage level to be mixed with other half rows of bricks from the same or other storage levels in any desired blending pattern and before delivery by conveyor 44 to stacking and packaging apparatus 46 and 48.

In the illustrative embodiment, both the storage elevator 22 and the blending elevator 42 comprise at least two levels of conveyors to that bricks may be transferred both into and out of the elevator sections simultaneously at the same or different storage levels thus maintaining the capacity and production rate of the machine at a very high level while yet permitting a high degree of flexibility in selecting a desired blending pattern.

While no special control apparatus is herein disclosed for controlling this invention, those skilled in the art will readily appreciate that normally automatic controls will be devised for controlling such an unloading and blending device or alternatively the operation of this device could be controlled from a control console by an operator for semi-automatic operation.

Figure 3:
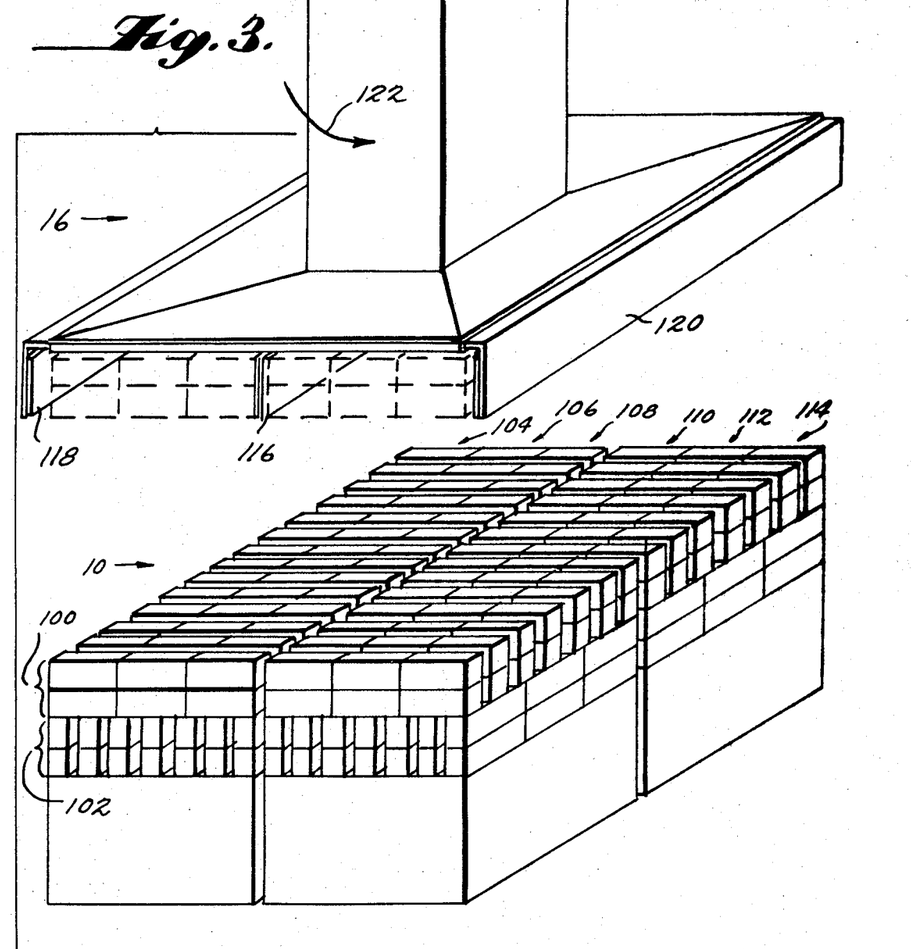
FIG. 3 is an enlarged perspective view of double layers of spaced-apart bricks on a kiln car with the gripping device shown somewhat schematically.

Referring now to FIG. 3, the gripping device 16 and the layered stacks of bricks 10 are shown in more detail. As shown, the layered stacks comprise double layers such as 100 and 102 with the bricks in adjoining double layers being perpendicularly disposed with respect to one another. While the end faces of most of the bricks are already adjacent, the wider sides of the bricks are spaced apart such that in the illustration of FIG. 3 there are, for instance, six double rows of spaced-apart bricks such as rows 104, 106, 108, 110, 112 and 114 with a space between the brick end faces of rows 108 and 110, as shown.

Gripper 16, which may be similar to the gripper assembly described in U.S. Pat. No. 3,270,897, is shown aligned and ready to descend and pick up double layer 100. As shown, it comprises a tongue 116 aligned with the space between rows 108 and 110 and two relatively movable side gripping portions 118 and 120 for engagement with the left and righthand end faces of the double layer 100 respectively. The gripper 16 is mounted for two-dimensional translation and rotation as well as vertical movement to permit alignment of the operating gripper members with the alternately perpendicularly disposed double layers of bricks in stack 10, as will be appreciated. For instance, the rotational movement of the gripper is indicated by arrow 122.

Figure 4:
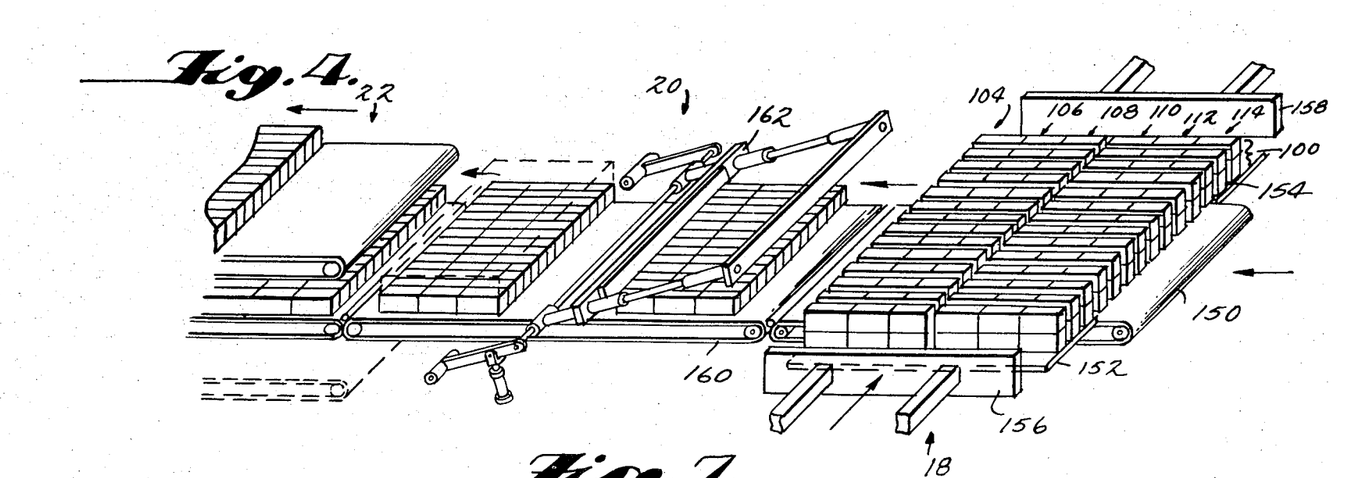

When the gripper device 16 is properly aligned with a double layer such as layer 100, the layer is then gripped and transferred to a receiving table 18 shown in more detail at FIG. 4. As shown in FIG. 4, the receiving table 18 comprises a conveyor 150 with table extensions 152 and 154 located at either side thereof. The spaced-apart double layer of bricks is placed by the gripper on both the conveyor and the laterally extending table extensions 152 and 154 in substantially the same spaced apart condition as existed in the original stack 10. Thereafter, pusher elements 156 and 158 push against the spaced apart double layer of bricks from opposite directions transverse to the conveyor 150 thereby closing up the spaces between each of the bricks in rows 104, 106, 108, 110, 112, and 114 thus making these rows into laterally abutting rows of bricks. Other devices may also be used for closing up the spaced-apart bricks as will be obvious to those skilled in the art.

Double layers of laterally abutting rows 104, 106 and 108 are then indexed off conveyor 150 onto conveyor 160 which is associated with the unfacing apparatus 20 also shown in FIG. 4. After being conveyed to the far side of the unfacing conveyor 160, this double layer is stopped in position for a turnover apparatus 162 to grip the top layer of bricks and separate them from the bottom layer of bricks while rotating them through substantially 180° and depositing this top layer of bricks in a face up condition at the opposite end (righthand end in FIG. 4) of conveyor 160. As shown in FIG. 4, this top layer of bricks has just been deposited on the conveyor in a face up condition while the original position of the bricks is shown in dashed lines over the lower layer of bricks. (The turnover device used at this point may be substantially similar to that shown in U.S. Pat. No. 3,468,998.)

Thus, the unfacing device 20 produces a single layer of laterally abutting rows of bricks all faced upwardly. Of course, the next three rows 110, 112 and 114 will next be similarly advanced into the unfacing device 20 and converted into a single upwardly faced layer of laterally abutting rows of bricks, in a similar fashion. From conveyor 160, the laterally abutting rows of bricks from a layer such as layer 100 (in the illustrative of FIG. 5 this would comprise four groups of 3 rows each of laterally abutting upwardly facing bricks) are conveyed onto a storage elevator conveyor 22 (shown in more detail in FIG. 5).

As shown in FIG. 5, the storage elevator 22 is vertically adjustable as, for instance, on vertically movable chains 200 and 202, trained around sprockets 201, 203. The purpose of elevator 22 is to transfer the laterally abutting rows of bricks from a layer (such as double layer 100) from the unfacing device 20 into one of the storage conveyor levels 24, 26, or 28. To speed up the handling process and thus improve the capacity and production of the machine, the storage elevator 22 is shown as comprising at least two storage elevator conveyors, such as 204 and 206 (see FIG. 5), which are spaced apart a distance equal to the spacing between the storage levels 24, 26, and 28, as shown. In this manner, bricks may be simultaneously transferred into and out of storage elevator 22 at desired levels. For instance, as shown in FIG. 5, bricks are being transferred into the storage elevator on conveyor 206 while bricks are simultaneously being transferred out of the store elevator on conveyor 204 into storage conveyor 24. Of course, if bricks were to be transferred into level 26 only a single conveyor 206 would be needed. However, to fully accommodate the plurality of storage levels, it is preferred that at least two storage elevator conveyors 204, 206 to be utilized to permit simultaneous transfer out of the elevator at more than one level. The conveyor 206 is also shown in dotted lines in a lowered position in FIG. 5 for delivery of bricks into storage conveyor level 28. Conveyors 204, 206 are suitably drivingly connected to the chains 200, 202, as will be appreciated, for adjustment of the vertical position thereof.

The overall storage capacity of the apparatus comprises primary storage conveyors 24, 26, and 28 as well as corresponding buffer storage conveyors 30, 32, and 34, as seen in FIG. 1. Thus, when one of the storage levels 24, 26, or 28 is exhausted of bricks, the bricks remaining in buffer areas 30, 32 and 34 may continue to be used in a blending operation (to be described later) while the depleted storage area 24, 26 or 28 is refilled through storage elevator 22, as will be evident.

In moving laterally abutting rows of bricks from storage levels 24, 26 and 28 into corresponding buffer conveyors 30, 32 and 34, each of the laterally abutting rows of bricks may be separated from neighboring rows of bricks by properly indexing and coordinating the operation of the buffer and storage conveyors involved in the transfer. In the illustrative embodiment, provisions are made for using two stacking machines (not shown, but intended to be positioned adjacent stations 46, 48 shown in FIG. 1) and thus the laterally abutting rows of bricks shown in FIG. 5 are not shown as separated into individual rows of bricks in the buffer area but rather are shown as separated into double rows of laterally abutting bricks. However, if only a single stacker is to be utilized for the final output of the machine, the laterally abutting rows could of course be separated into spaced, individual rows of bricks. The capacity of the machine is however increased by the use of two stackers and thus the illustrative embodiment is designed for use with two stacking machines as will be evident.

After passing through the buffer conveyors 30, 32 and 34, double abutting rows of bricks 208, 210 and 212 travel beyond the end of the respective buffer conveyors onto a plurality of parallel and spaced horizontal rollers 214 arranged in each of the blender feeding levels 36, 38 and 40, as shown in FIG. 6. The axes of these rollers are disposed at right angles to the direction of movement of the buffer conveyors. The plurality of supporting rollers 214 which effectively provide extensions of the buffer conveyors 30, 32 and 34 are indicated at blender feeder level 38. It will be appreciated that the structure at each of the blender feeder levels 36, 38 and 40 will be the same. FIG. 6 shows feeder levels 36 and 38 in vertical sections, taken at different regions, to better illustrate the roller and conveyor structures at each level, as will be appreciated.

In between the rollers 214, at each level, a plurality of narrow belts 216 is arranged, as indicated in FIGS. 1 and 6. These belts 216, move in a direction transverse to the direction of movement of the storage and buffer conveyors (to the right in FIG. 6). Normally, these narrow belts 216 are travelling just below the level of the bottom edge of the double rows of bricks 208, 210 and 212 (supported by rollers 214) such that the narrow belts 216 do not engage any brick surfaces. However, when it is desired to feed bricks from any given level such as 36, 38 or 40, the belt raising mechanism shown at level 36 in FIG. 6 may be utilized to raise the moving narrow belts 216 into engagement with the lower edges of the brick surfaces and to thereby move the laterally abutting rows of bricks off the the right, as shown in FIG. 6, transverse to the direction of previous brick movements in the storage and buffer storage areas.

For instance, as shown in FIG. 6, each of the narrow belts 216 rides upon a plurality of narrow rollers 218 which are, in turn, attached to a vertically movable support member 220. This vertically movable support 220 is in turn supported by bell crank levers 222, 224 pivoted about horizontal axes 226 and 228 respectively, defined, for example, by suitable structure journalled to the machine frame, as will be evident. Movement of levers 222, 224 may be effected by a piston and cylinder device 230 and rod 231. Thus, when piston and cylinder device 230 pivots levers 222 and 224 in a counterclockwise direction as shown in FIG. 6, roller support 220 is moved upwardly and rollers 218 move the belt 216 into engagement with the lower surface of rows of laterally abutting bricks such as 208 to move them off to the right as shown in FIG. 6. The bricks 212 at level 40 are shown with belt 216 in a raised position at the beginning of a movement towards the right.

To accept the bricks from the blender feeding levels 36, 38 and 40 there is provided a blender elevator 42 shown in FIG. 6. The purpose of elevator 42 is to provide a vertically adjustable conveyor for conveying bricks from any one of the storage areas onto an off-bearing conveyor 44 also shown in FIG. 6. Here, at least two conveyors at different levels are utilized in the blender elevator 42 such that bricks may be simultaneously transferred both into and out of the elevator section at the same or different elevations thus increasing the handling capacity of the machine without in anyway impairing its blending flexibility. Each conveyor 250, 252 in storage elevator 42 comprises narrow belts, ends of which are interleaved between adjacent ends of narrow belts 216 of the feeding conveyors, as indicated. Tongues 215 are shown bridging the gap between the intermeshed pulleys of the feeding and elevator conveyors.

In addition, in the preferred embodiment, the length of the blending elevator conveyors 250 and 252 is at least equal to the length of one and one-half rows of laterally abutting bricks. Brick stopping means (to be discussed below) ensure that one-half row of bricks always remains at the righthand side of each of the blender elevator conveyors. Thus, if a complete row of bricks is moved in behind such a remaining half row, one and one-half rows of bricks will be present on the same conveyor. If, subsequently, bricks equal in length to one whole row are sequentially transferred from the end of the conveyor, the newly added complete row of bricks will be effectively split with the last half remaining on the conveyor while the first half travels behind and with the remaining half row previously left on that particular conveyor. Thus, at the output, the last half of one row of bricks from one of the storage levels is effectively blended with the first half of a row of bricks from the same or any other storage level thereby permitting an extremely flexible blending pattern to be obtained. It should, of course, be understood that modifications in the machine could provide for mixing quantities less than a whole row other than exactly one-half rows if that were desired.

As shown in FIG. 6, the one-half row of bricks 254 (the last half of some previously stored row from some one of the feeding levels 36, 38 or 40) is followed by the first half 256 of another row of bricks from the same or a different feeding level. The last half 258 of the same row remains at the righthand end of conveyor 250 where it is held by a suitable brick stopping device 264 (to be described later) thus preventing its movement therebeyond. At the same time, another row of bricks 260 is shown as being conveyed into the lower level conveyor 252 into position behind a remaining half row 262 from a previous row which is prevented from moving off conveyor 252 by the brick stopping means 264.

Figure 7:
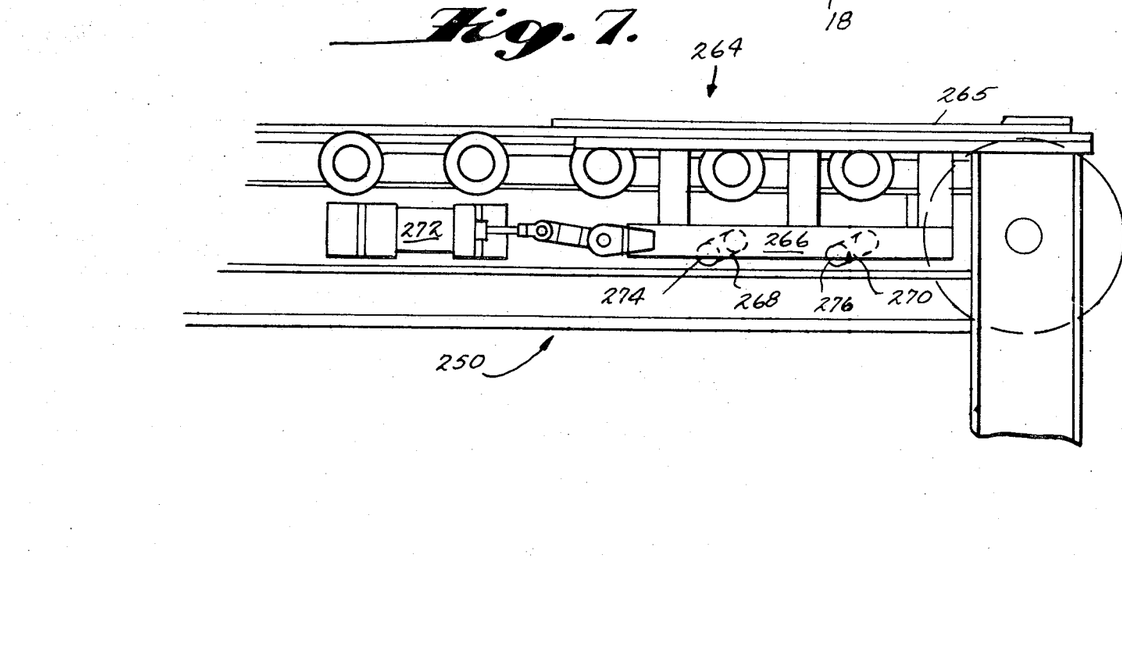
FIG. 7 is an enlarged and fragmentary elevational view of the brick stopping apparatus shown in FIG. 6.

The brick stopping means 264, as shown in FIG. 7, comprises brick raising bars 265 disposed between the narrow belts on conveyors 250 and 252 and suitably arranged to be vertically adjustable such that, when raised, any bricks resting over bars 265 are raised out of contact with the moving narrow belts comprising conveyors 250 and 252, thereby preventing any further movement of the bricks. In the preferred embodiment, the length of bars 265 is substantially equal to the length of one-half row of bricks. As shown in FIG. 7, the bars 265 are rigidly connected with a lower bar member 266 which is pivotably connected to links 268 and 270 which links are, in turn, pivotably connected with the frame for the conveyor. Thus, when bar 266 is moved to the left by an actuating mechanism (such as a piston and cylinder 272) the links pivot about their fixed pivot axes 274, 276 and raise the bar 266 which in turn raises connected brick raising bars 265 to elevate any bricks (resting on bars 265) away from engagement with the underlying moving belts of conveyors 250 or 252.

It will be appreciated that the structure for conveyor 252 preferably will be the same as that for conveyor 250, including the same brick stopping means structure 264, etc. In this connection, FIG. 6 shows the upper conveyor 250 partially cut away or in vertical sections, for illustrative purposes, while the bottom conveyor 252 is shown in elevation, not cut away or in sections.

Although only one embodiment of this invention has been specifically described above, it will be readily understood by those skilled in the art that there are many possible modifications of the disclosed method and apparatus which will still substantially produce the described results and are therefore intended to be within the scope of this invention.

What is claimed is:

1. Apparatus for unloading and blending bricks from layered stacks of rows of bricks or similar articles, said apparatus comprising:

a receiving conveyor, gripping means for gripping and transporting at least one layer of said bricks onto said receiving conveyor, a plurality of storage conveyors disposed at a plurality of corresponding storage levels for temporarily storing and conveying said layers of rows of bricks, a vertically adjustable elevator conveyor for transferring said layers of bricks from said receiving conveyor to any selected one of said storage conveyors, indexing means for separating at least one row of bricks from other rows in each of said storage levels, blending means for mixing groups of bricks from one of said separated rows at one of said storage levels with groups of bricks from another separated row in the same or another one of said storage levels in any desired sequence.

2. Apparatus for unloading and blending bricks from layered stacks of spread apart bricks or similar articles, said apparatus comprising:

a receiving conveyor, gripping means for gripping and transporting at least one layer of said spaced apart bricks onto said receiving conveyor, compressing means for pushing said spaced apart bricks together thereby forming at least one layer of laterally abutting rows of bricks, a plurality of storage conveyors disposed at a plurality of corresponding storage levels for temporarily storing and conveying said layers of laterally abutting rows of bricks, a vertically adjustable elevator conveyor for transferring said layers of bricks from said compressing means to any selected one of said storage conveyors, indexing means for separating at least one laterally abutting row of bricks from other rows in each of said storage levels, blending means for mixing groups of bricks from one of said separated rows at one of said storage levels with groups of bricks from another separated row in the same or another one of said storage levels in any desired sequence.

3. Apparatus as in claim 2 wherein said gripping means is constructed to grip and transport a double layer of spaced apart bricks including an upwardly faced bottom layer and a downwardly faced top layer and further comprising:

unfacing means for separating said top layer from said bottom layer and for rotating said top layer through substantially 180° thereby effecting a single upwardly facing layer of bricks in laterally abutting rows.

4. Apparatus as in claim 2 wherein said compressing means comprises:

a table extension on either side of said receiving conveyor, and pusher surfaces disposed along said table extensions and movable in a transverse direction to the movement of said conveyor for pushing the bricks laterally until they meet in laterally abutting rows.

5. Apparatus as in claim 2 wherein said vertically adjustable elevator conveyor has at least two levels for simultaneous operation thereby permitting transfer of one brick layer from said compressing means into said elevator means simultaneously with transfer of another brick layer from said elevator means into said one of said storage conveyors.

6. Apparatus as in claim 2 wherein said indexing means comprises:

a buffer conveyor aligned with said storage conveyors at each of said levels, a plurality of spaced apart rollers aligned at the end of each of said buffer conveyors and extending along the width thereof for receiving at least one row of indexed bricks, belts disposed between said spaced apart rollers at each of said levels and movable in a direction transverse to said storage and buffer conveyors, and belt raising means for raising said belts into contact with said row of indexed bricks thereby permitting said indexed bricks to be moved transversely with respect to said conveyors.

7. Apparatus as in claim 6 wherein said blending means comprises:

a off-bearing conveyor, a blender elevator conveyor for transferring bricks from said belts at any selected one of said levels to said off-bearing conveyor.

8. Apparatus as in claim 7 wherein said blender elevator comprises:

at least two vertically movable conveyors each of which is at least equal in length to one and one-half the length of one of said rows of laterally abutting bricks thereby permitting transfer of bricks onto said off-bearing conveyor simultaneously with transfer of bricks onto said blender elevator from another level, and brick stopping means for stopping the motion of substantially one-half row of bricks on the blender elevator conveyors nearest the off-bearing conveyor thereby permitting the blending of this one-half row with another one-half row of bricks.

* * * * *